(12) United States Patent
Whipple

(10) Patent No.: US 12,276,561 B2
(45) Date of Patent: Apr. 15, 2025

(54) TENSION MEASURING ASSEMBLY

(71) Applicant: John Whipple, San Angelo, TX (US)

(72) Inventor: John Whipple, San Angelo, TX (US)

( * ) Notice: Subject to any disclaimer, the term of this patent is extended or adjusted under 35 U.S.C. 154(b) by 121 days.

(21) Appl. No.: 18/118,623

(22) Filed: Mar. 7, 2023

(65) Prior Publication Data

US 2024/0302233 A1    Sep. 12, 2024

(51) Int. Cl.
*G01L 5/04* (2006.01)
*B60P 7/08* (2006.01)
*G01L 5/102* (2020.01)

(52) U.S. Cl.
CPC ............ *G01L 5/047* (2013.01); *B60P 7/0861* (2013.01); *G01L 5/102* (2013.01)

(58) Field of Classification Search
CPC ........... G01L 5/047; G01L 5/12; B60P 7/0861
USPC ............................................. 73/862.391, 862
See application file for complete search history.

(56) References Cited

U.S. PATENT DOCUMENTS

| | | | | |
|---|---|---|---|---|
| 4,408,925 | A * | 10/1983 | Louie | F16G 11/12 411/10 |
| 7,159,948 | B1 * | 1/2007 | Wolf | B60N 2/2887 297/253 |
| 10,328,841 | B2 | 6/2019 | Bika | |
| 11,828,348 | B2 * | 11/2023 | Squires | F16G 11/12 |
| 2002/0152669 | A1 * | 10/2002 | Harvanek | A01K 97/06 43/21.2 |
| 2003/0174055 | A1 * | 9/2003 | Tardif | B60P 7/0861 340/440 |
| 2005/0166370 | A1 * | 8/2005 | Miles | E05B 75/00 297/464 |
| 2009/0250543 | A1 * | 10/2009 | Bond | B66D 1/04 29/469 |
| 2011/0000317 | A1 * | 1/2011 | Ruan | B60P 7/083 73/862.42 |
| 2013/0162420 | A1 * | 6/2013 | Stoddard | B60P 7/0861 340/425.5 |
| 2016/0061676 | A1 * | 3/2016 | Brown | G01L 5/0033 73/862.68 |
| 2019/0001863 | A1 * | 1/2019 | Taylor | H04W 4/70 |
| 2020/0031269 | A1 * | 1/2020 | Chu | G01L 5/103 |

(Continued)

FOREIGN PATENT DOCUMENTS

| | | | | |
|---|---|---|---|---|
| CN | 207171897 U | * | 4/2018 | |
| FR | 2965252 A1 | * | 3/2012 | ............ B60P 7/0861 |

(Continued)

OTHER PUBLICATIONS

Translation KR_101734851 (Year: 2017) May 16, 2017.*
Translation FR 965252 (Year: 2023) Mar. 30, 2012.*

*Primary Examiner* — Peter J Macchiarolo
*Assistant Examiner* — Monica S Young

(57) ABSTRACT

A tension measuring assembly includes a pair of straps that has an attachment that can be attached to a tie down chain which is securing cargo on a flatbed trailer. A tension meter is provided and each of the pair of straps is attached to the tension meter. The tension meter measures tension in each of the straps to measure the tension in the tie down chain when the straps are attached to the tie down chain. A display unit is in remote communication with the tension meter and the display unit displays the tension measured by the tension meter. In this way the display unit facilitates a driver of the vehicle to monitor the tension of the tie down chain.

6 Claims, 7 Drawing Sheets

(56) References Cited

U.S. PATENT DOCUMENTS

2021/0131526 A1* 5/2021 Squires .................. F16G 11/14
2023/0112045 A1* 4/2023 Shelton ................. G01L 5/0033
                                                                                         73/826

FOREIGN PATENT DOCUMENTS

KR         101734851 B1 * 5/2017
WO    WO2020001703    1/2020

* cited by examiner

TENSION MEASURING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tension devices and more particularly pertains to a new tension device for monitoring the tension of a tie down chain securing cargo on a flatbed trailer. The device includes a tension monitor and a pair of straps attached to the tension monitor. Each of the straps is attached to a tie down chain such that the tension monitor can measure the tension in the tie down chain. The device includes a display unit positioned in a tow vehicle and the display unit is in wireless communication with the tension monitor to facilitate a driver to monitor the tension of the tie down chain.

(2) Description of Related Art Including Information Disclosed Under 37 CFR 1.97 and 1.98

The prior art relates to tension devices including a tension alert device that includes a tension alert that is attached between a cargo strap and anchoring point of the cargo strap for monitoring tension of the cargo strap. The prior art discloses a tension alert device that includes a tension sensor that is attached between a cargo strap and an anchoring point of the cargo strap and a monitoring unit that is in remote communication with the tension sensor for remotely monitoring tension of the cargo strap. The prior art discloses a tension monitor that includes a tension meter integrated into a cargo strap that is in wireless communication with a remote display to facilitate tension in the cargo strap to be remotely monitored. The prior art discloses a ratchet strap assembly that has a load sensor integrated into a ratchet.

BRIEF SUMMARY OF THE INVENTION

An embodiment of the disclosure meets the needs presented above by generally comprising a pair of straps that has an attachment that can be attached to a tie down chain which is securing cargo on a flatbed trailer. A tension meter is provided and each of the pair of straps is attached to the tension meter. The tension meter measures tension in each of the straps to measure the tension in the tie down chain when the straps are attached to the tie down chain. A display unit is in remote communication with the tension meter and the display unit displays the tension measured by the tension meter. In this way the display unit facilitates a driver of the vehicle to monitor the tension of the tie down chain.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
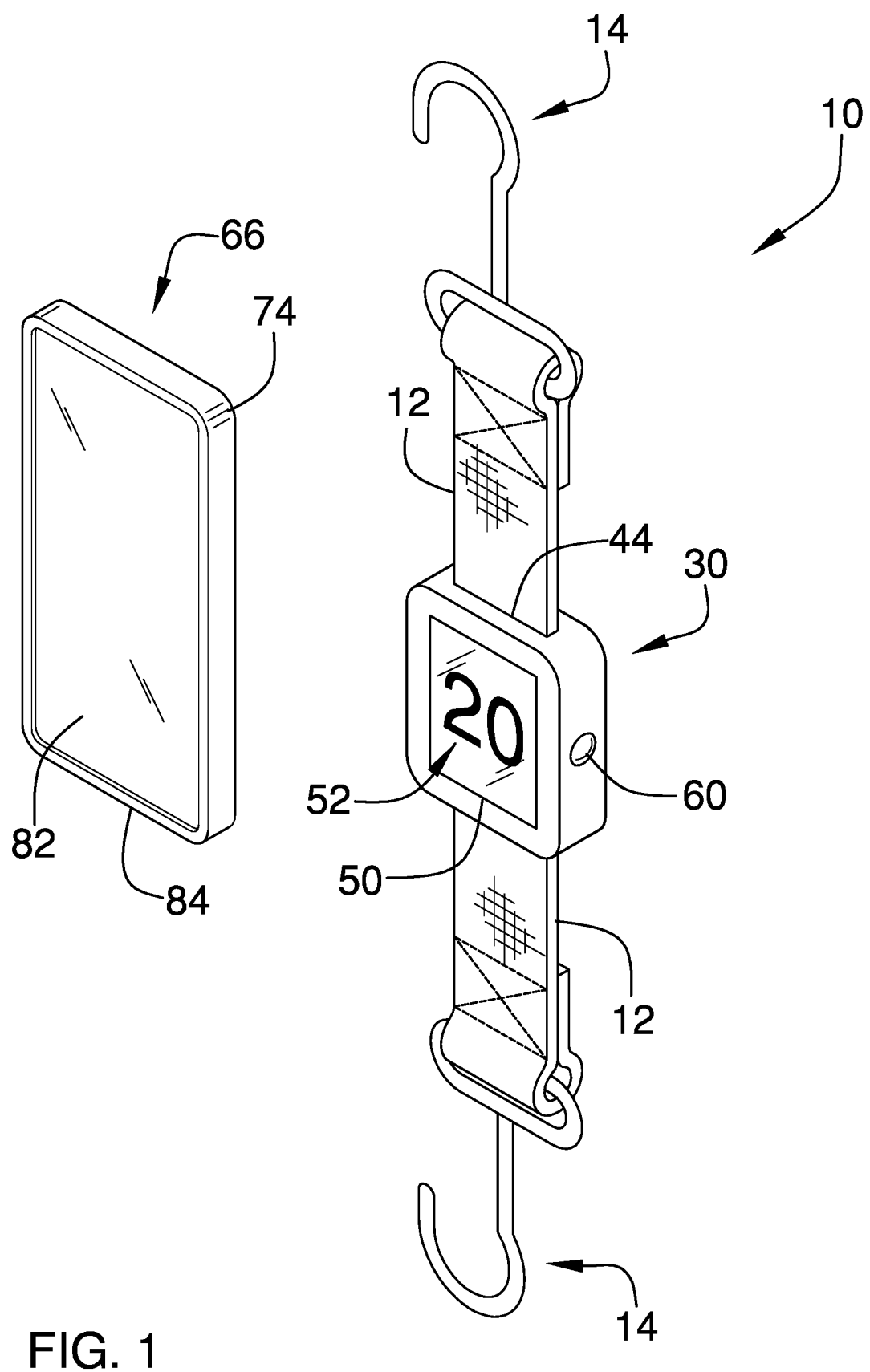
FIG. 1 is a front perspective view of a tension measuring assembly according to an embodiment of the disclosure.
Figure 2:
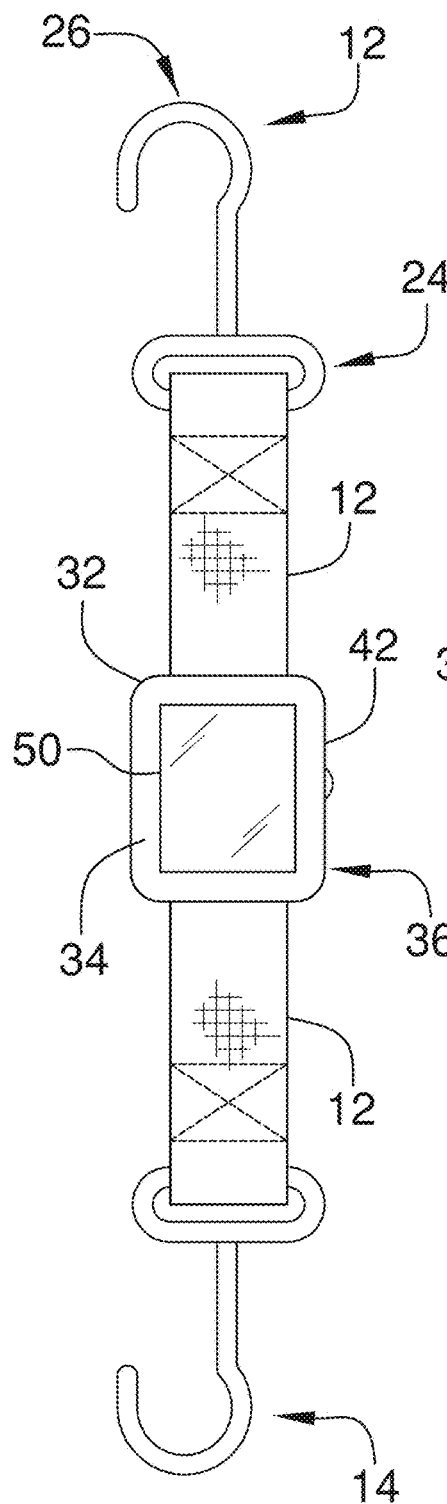
FIG. 2 is a back view of an embodiment of the disclosure.
Figure 3:
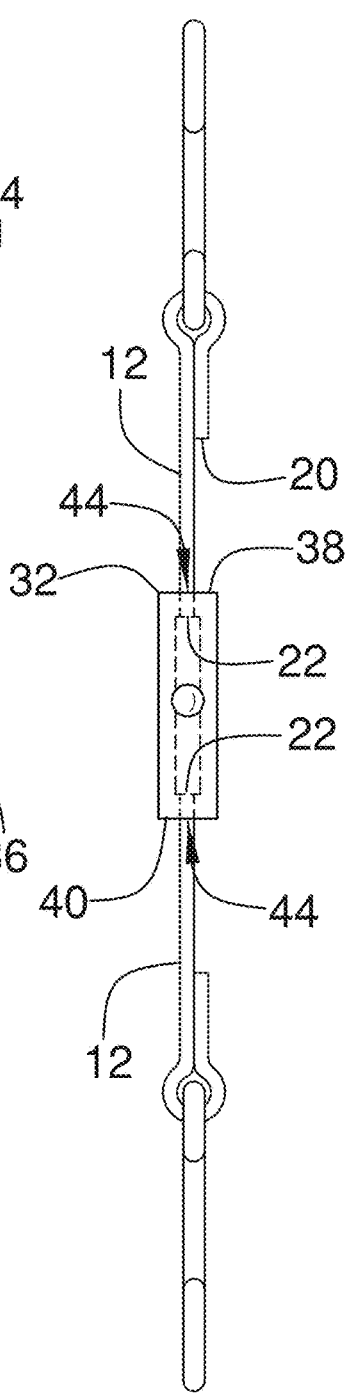
FIG. 3 is a right side view of an embodiment of the disclosure.
Figure 4:
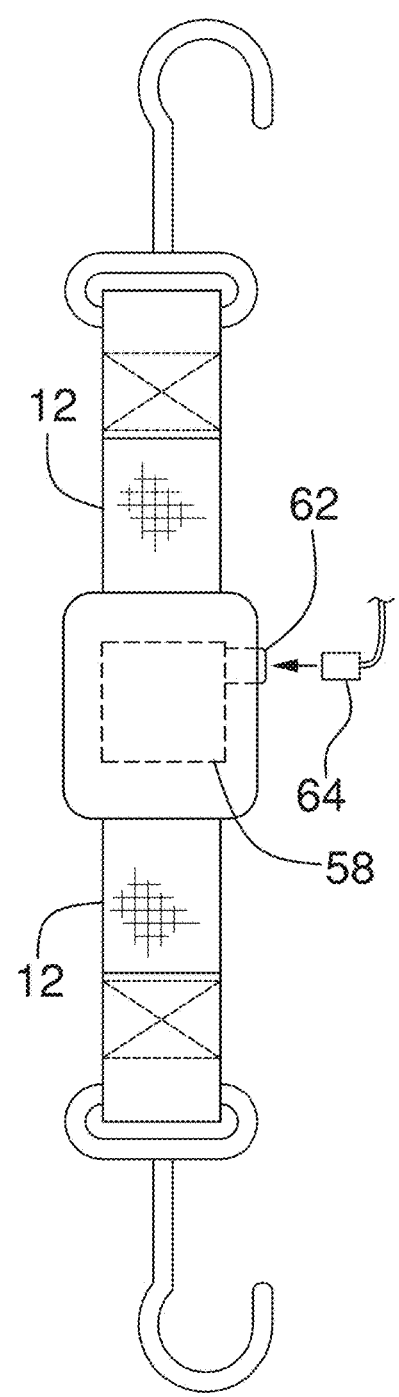
FIG. 4 is a back phantom view of an embodiment of the disclosure.

With reference now to the drawings, and in particular to FIGS. 1 through 9 thereof, a new tension device embodying the principles and concepts of an embodiment of the disclosure and generally designated by the reference numeral 10 will be described.

As best illustrated in FIGS. 1 through 9, the tension measuring assembly 10 generally comprises a pair of straps 12 that each has an attachment 14 that can be attached to a tie down chain 16 which is securing cargo 17 on a flatbed trailer 18. The flatbed trailer 18 may be a semi trailer, for example, and the tie down chain 16 may be part of a chain tensioner that is commonly employed for securing heavy equipment on a flatbed, for example. Each of the straps 12 has a first end 20 and a second end 22 and the attachment 14 associated with each of the straps 12 includes a ring portion 24 and a hook portion 26. A respective one of the straps 12 extends through the ring portion 24 of a respective one of the attachments 14 having the first end 20 of the respective strap 12 being attached to the respective strap 12 thereby forming a closed loop around the ring portion 24. The hook portion 26 curves toward the ring portion 24 such that the hook portion 26 can be extended through a respective link 28 of the tie down chain 16. Additionally, each of the straps 12 is comprised of an elastomeric material thereby facilitating the straps 12 to be stretched.

A tension meter 30 is provided and each of the pair of straps 12 is attached to the tension meter 30. The tension meter 30 measures tension in each of the straps 12 to measure the tension in the tie down chain 16 when the pair of straps 12 are attached to the tie down chain 16. The tension meter 30 comprises a housing 32 that has a front wall 34 and an outer wall 36 and the outer wall 36 has a top side 38, a bottom side 40 and a lateral side 42. The outer wall 36 has a pair of slots 44 each extending through a respective one of the top side 38 and the bottom side 40 and each of the straps 12 extends through a respective one of the slots 44 such that the second end 22 of each of the pair of straps 12 is positioned within the housing 32.

The tension meter 30 includes a tension control circuit 46 that is positioned within the housing 32. The tension meter 30 includes a tension sensor 48 that is positioned within the housing 32. The tension senor 48 is attached to the second end 22 of each of the pair of straps 12 thereby facilitating the tension sensor 48 to sense tension in the straps 12. Additionally, the tension sensor 48 is electrically coupled to the tension control circuit 46 thereby facilitating the tension sensor 48 to communicate the tension to the tension control circuit 46.

The tension meter 30 includes a display 50 that is integrated into the front wall 34 of the housing 32 and the display 50 is electrically coupled to the tension control circuit 46. The display 50 displays indicia 52 comprising numbers to communicate the degree of tension measured by the tension sensor 48. Additionally, the display 50 may comprise a light emitting diode display or other type of electronic display. The tension meter 30 includes a transmitter 54 that is positioned within the housing 32 and the transmitter 54 is electrically coupled to the tension control circuit 46. Furthermore, the transmitter 54 broadcasts a communication signal which comprises the tension sensed by the tension sensor 48 and the transmitter 54 may comprise a radio frequency transmitter or the like.

The tension meter 30 includes a power supply 56 that is integrated into the housing 32 and the power supply 56 is electrically coupled to the tension control circuit 46. The power supply 56 comprises a rechargeable battery 58 that is positioned in the housing 32 and the rechargeable battery 58 is electrically coupled to the tension control circuit 46. Additionally, the power supply 56 includes a power button 60 that is movably integrated into the lateral side 42 of the outer wall 36 of the housing 32. The power button 60 is electrically coupled to the tension control circuit 46 for turning the tension control circuit 46 on and off when the power button 60 is depressed. The power supply 56 includes a charge port 62 that is recessed into the lateral side 42 of the outer wall 36 of the housing 32 to insertably receive a charge cord 64. The charge port 62 is electrically coupled to the rechargeable battery 58 for charging the rechargeable battery 58. Furthermore, the charge port 62 may comprise a universal serial bus port or other similar type of charge port.

A display unit 66 is provided and the display unit 66 is in remote communication with the tension meter 30 thereby facilitating the display unit 66 to display the tension measured by the tension meter 30. In this way the display unit 66 can be positioned in a cab 68 of a vehicle 70 towing the flatbed trailer 18 thereby facilitating a driver 72 of the vehicle 70 to monitor the tension of the tie down chain 16. Thus, the driver 72 can be aware of an instance when the tie down chain 16 becomes loosened or becomes disconnected thereby facilitating the driver 72 to immediately correct the situation and avoid the potential danger of the cargo 17 becoming unsecured of the flatbed trailer 18 during transport.

The display unit 66 comprises a display housing 74 that is positioned in the cab 68 of the vehicle 70, such as on a dashboard of the vehicle 70 or other conspicuous location that is readily visible to the driver 72. The display unit 66 includes a display control circuit 76 positioned in the display housing 74 and the display control circuit 76 is electrically coupled to a power source 78 comprising an electrical system of the vehicle 70. The display unit 66 includes a receiver 80 that is positioned in the display housing 74 and the receiver 80 is electrically coupled to the display control circuit 76. The receiver 80 is in wireless communication with the transmitter 54 such that the receiver 80 receives the communication signal from the transmitter 54 thereby facilitating the display control circuit 76 to receive the tension sensed by the tension sensor 48. Additionally, the receiver 80 may comprise a radio frequency receiver or the like.

A display 82 is integrated into a forward wall 84 of the display housing 74 such that the display 82 on the display housing 74 is visible to the driver 72. The display 82 on the display housing 74 is electrically coupled to the display control circuit 76. Additionally, the display 82 on the display housing 74 displays indicia 86 comprising numbers for communicating the tension sensed by the tension sensor 48. In this way the display 82 on the display housing 74 facilitates the driver 72 to visually verify the tension of the tie down chain 16. The display 82 on the display housing 74 may comprise a light emitting diode display or other type of electronic display.

Figure 5:
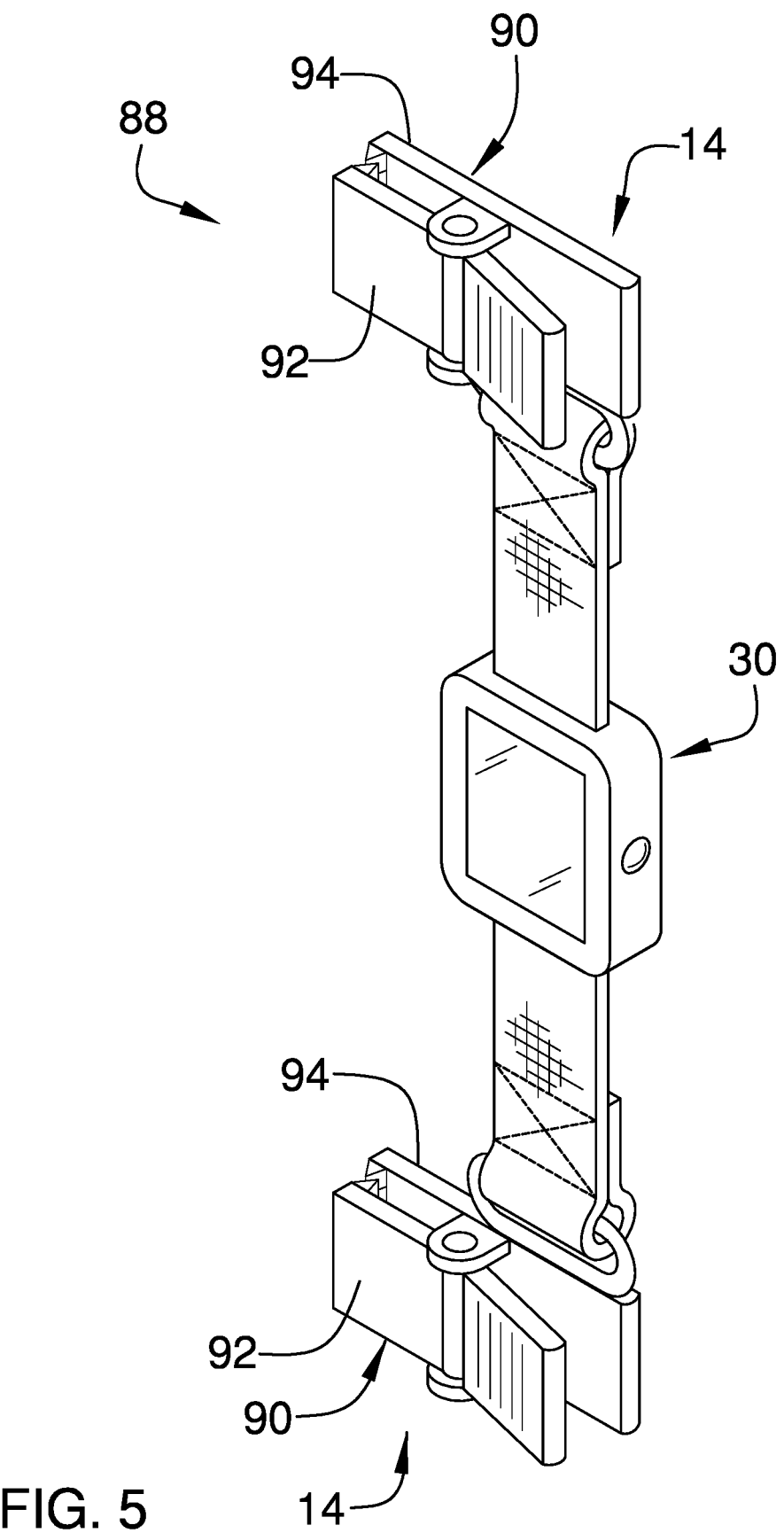
FIG. 5 is a perspective view of an alternative embodiment of the disclosure.
Figure 6:
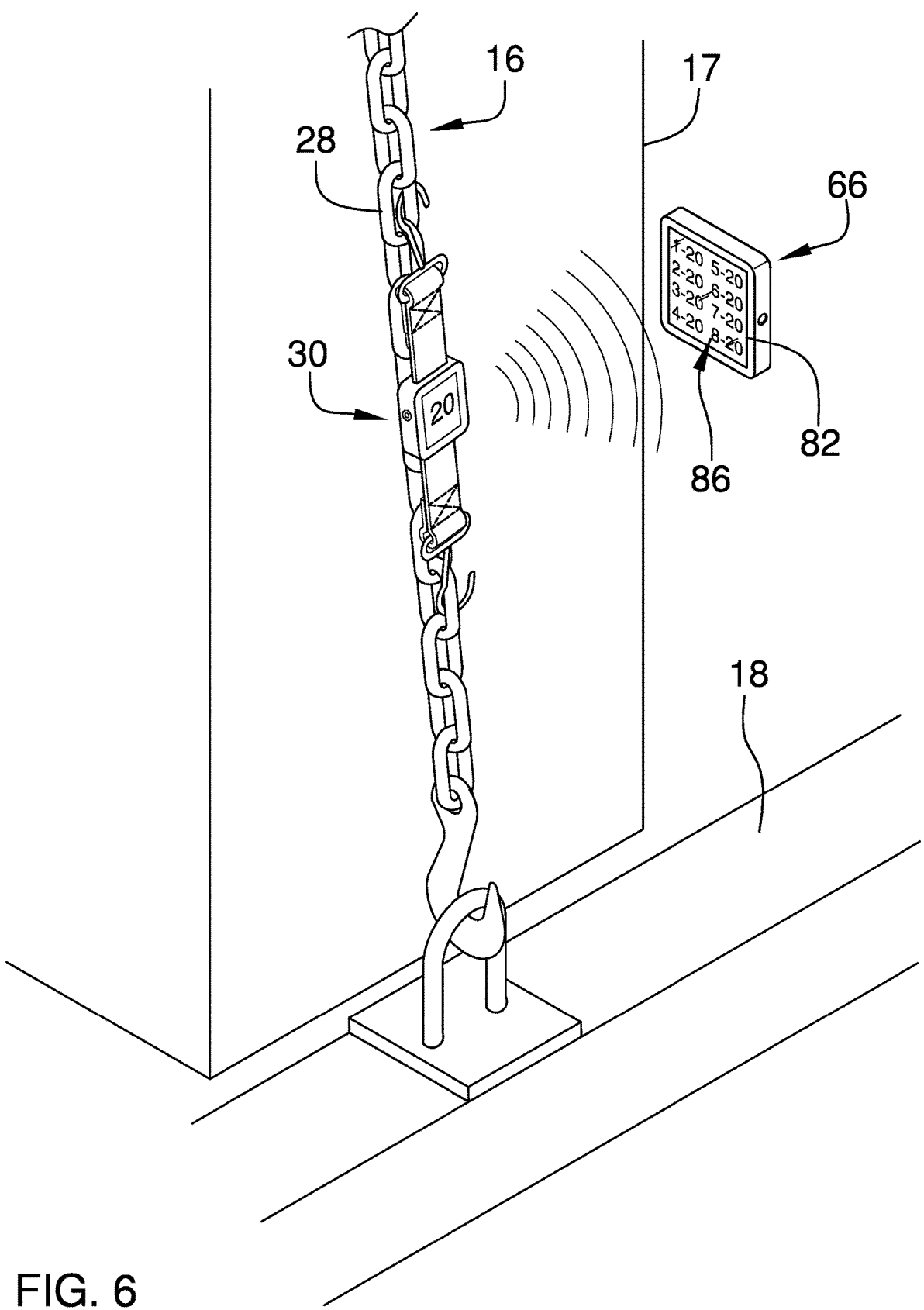
FIG. 6 is a perspective in-use view of an embodiment of the disclosure.
Figure 7:
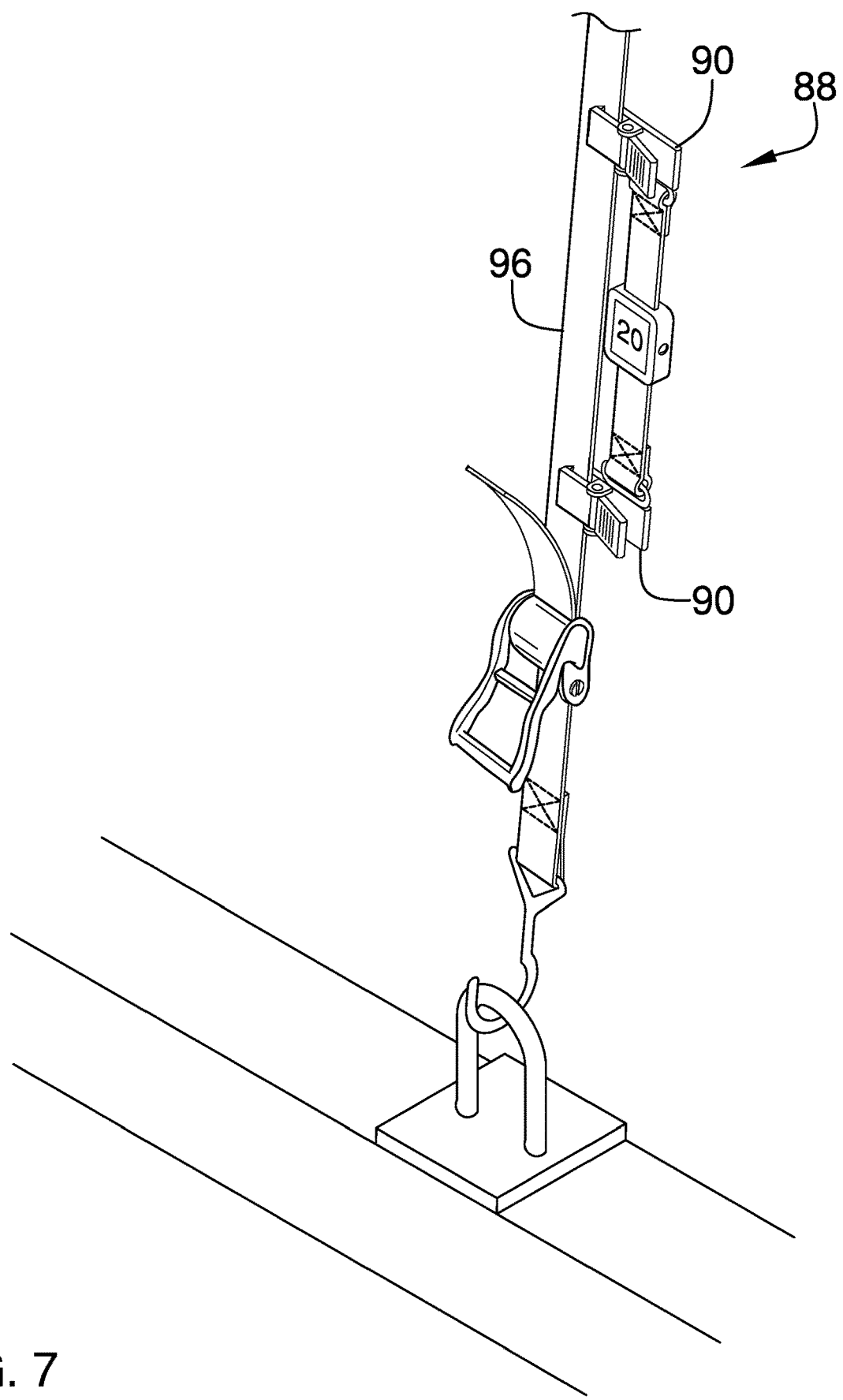
FIG. 7 is a perspective in-use view of an alternative embodiment of the disclosure.
Figure 8:
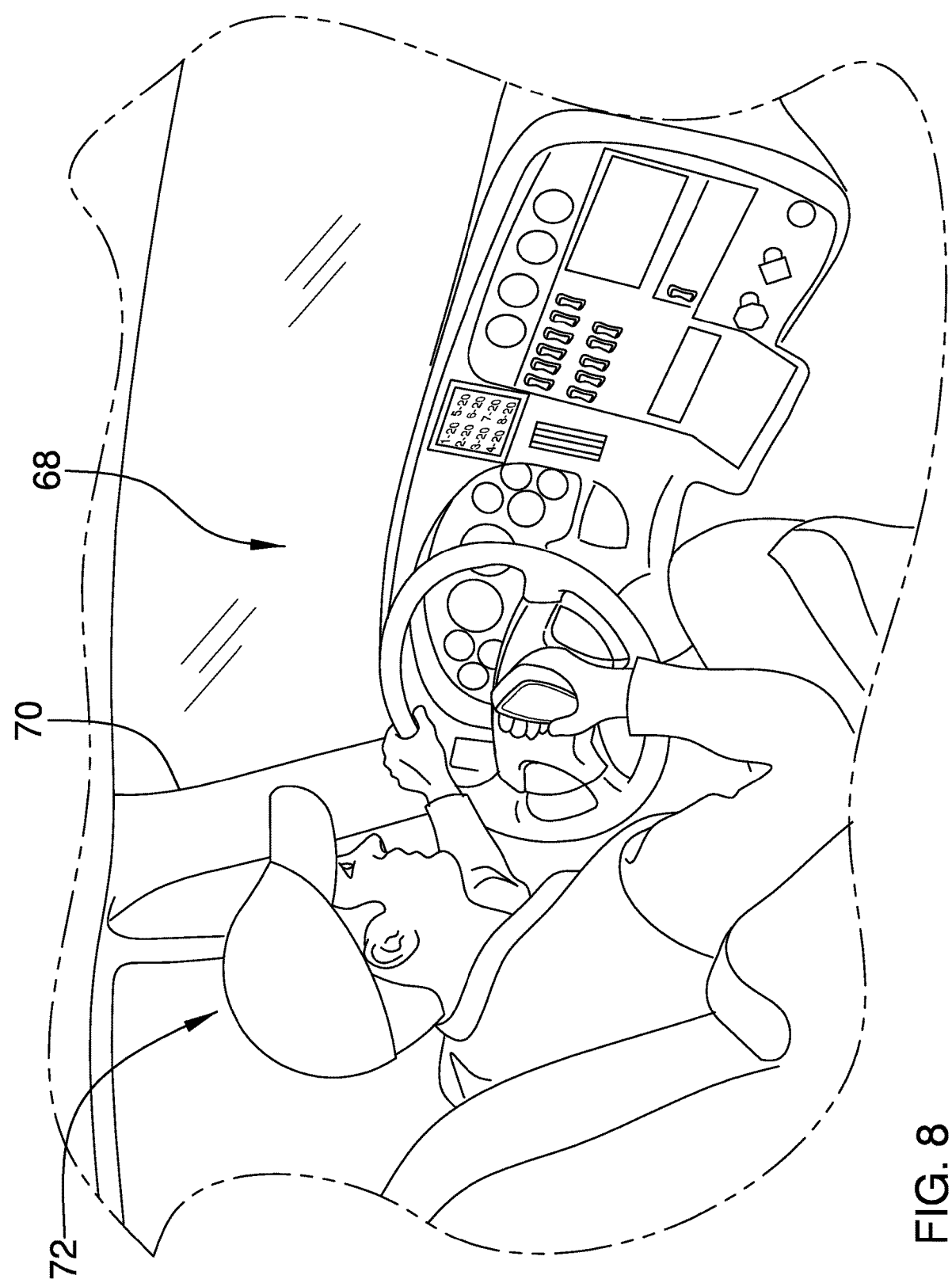
FIG. 8 is an interior view of a cab of a vehicle an embodiment of the disclosure.
Figure 9:
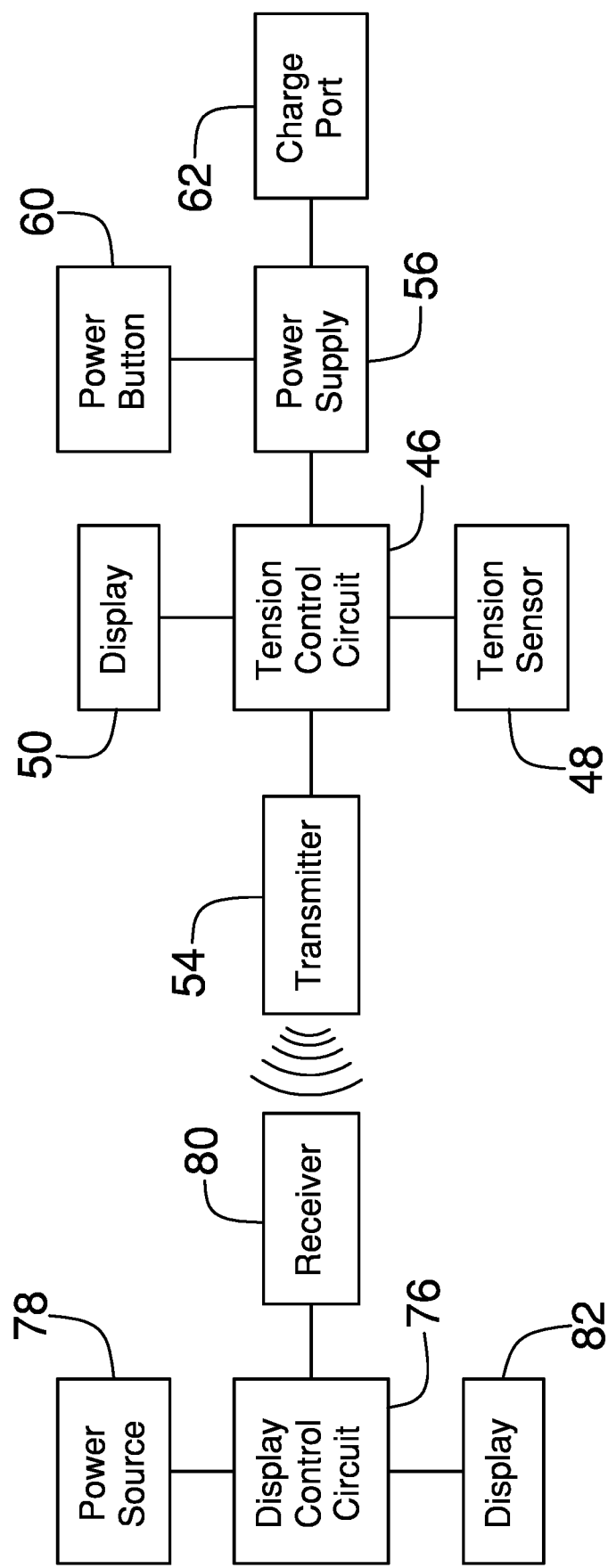
FIG. 9 is a schematic view of an embodiment of the disclosure.

In an alternative embodiment 88 shown in FIGS. 5 and 7, each of the attachments 14 comprises a clamp 90 that has a first jaw 92 pivotally attached to a second jaw 94. The clamp 90 associated with each of the attachments 14 is biased into a closed position having the first jaw 92 abutting the second jaw 94. The clamp 90 associated with each of the attachments 14 extends laterally away from the respective strap 12. In this way the clamp 90 on each of the straps 12 can be attached to a cargo strap 96 that is securing the cargo 17 to the flatbed trailer 18.

In use, each of the straps 12 is stretched to facilitate the attachment 14 on each of the straps 12 to be attached to the respective link 28 in the tie down chain 16. In this way the tension meter 30 can measure the tension in the straps 12. Furthermore, the display unit 66 displays the tension in the straps 12 that is measured by the tension meter 30. In this way the driver 72 can continuously monitor the tie down chain 16 thereby facilitating the driver 72 to immediately respond to the tie down chain 16 becoming loosened or disconnected. Thus, the driver 72 can prevent the cargo 17 from becoming unsecured while the cargo 17 is being transported.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tension measuring assembly for facilitating a driver of a cargo vehicle to monitor the tension of tie downs, said assembly comprising:
   a pair of straps, each of said straps having an attachment being configured to be attached to a tie down chain which is securing cargo on a flatbed trailer;
   a tension meter having each of said pair of straps being attached to said tension meter, said tension meter measuring tension in each of said straps wherein said tension meter is configured to measure the tension in the tie down chain when said pair of straps are attached to the tie down chain; and
   a display unit being in remote communication with said tension meter thereby facilitating said display unit to display the tension measured by said tension meter wherein said display unit is configured to be positioned in a cab of a vehicle towing the flatbed trailer thereby facilitating a driver of the vehicle to monitor the tension of the tie down chain; and
   wherein each of said straps has a first end and a second end, said attachment associated with each of said straps including a ring portion and a hook portion, a respective one of said straps extending through said ring portion of a respective one of said attachments having said first end of said respective strap being attached to said ring portion, said hook portion curving toward said ring portion wherein said hook portion is configured to be extended through a respective link of the tie down chain, each of said straps being comprised of an elastomeric material thereby facilitating said straps to be stretched.

2. The assembly according to claim 1, wherein said tension meter comprises:
   a housing having a front wall and an outer wall, said outer wall having a top side, a bottom side and a lateral side, said outer wall having a pair of slots each extending through a respective one of said top side and said bottom side, each of said straps extending through a respective one of said slots such that said second end of each of said pair of straps is positioned within said housing;
   a tension control circuit being positioned within said housing; and
   a tension senor being positioned within said housing, said tension senor being attached to said second end of each of said pair of straps thereby facilitating said tension sensor to sense tension in said straps, said tension sensor being electrically coupled to said tension control circuit thereby facilitating said tension sensor to communicate the tension to said tension control circuit.

3. The assembly according to claim 2, wherein said tension meter includes:
   a tension meter display being integrated into said front wall of said housing, said tension meter display being electrically coupled to said tension control circuit, said tension meter display displaying indicia comprising numbers to communicate the degree of tension measured by said tension sensor;
   a transmitter being positioned within said housing, said transmitter being electrically coupled to said tension control circuit, said transmitter broadcasting a communication signal comprising the tension sensed by said tension sensor; and
   a power supply being integrated into said housing, said power supply being electrically coupled to said tension control circuit, said power supply comprising:
      a rechargeable battery being positioned in said housing, said rechargeable battery being electrically coupled to said tension control circuit;
      a power button being movably integrated into said lateral side of said outer wall of said housing, said power button being electrically coupled to said tension control circuit for turning said tension control circuit on and off when said power button is depressed; and
      a charge port being recessed into said lateral side of said outer wall of said housing wherein said charge port is configured to insertably receive a charge cord, said charge port being electrically coupled to said rechargeable battery for charging said rechargeable battery.

4. The assembly according to claim 1, wherein:
said tension meter includes a transmitter and a tension sensor; and
said display unit comprises:
   a display unit display housing being configured to be positioned in the cab of the vehicle;
   a display control circuit being positioned in said display housing, said display control circuit being electrically coupled to a power source comprising an electrical system of the vehicle;
   a receiver being positioned in said display housing, said receiver being electrically coupled to said display control circuit, said receiver being in wireless communication with said transmitter such that said receiver receives said communication signal from said transmitter thereby facilitating said display control circuit to receive the tension sensed by said tension sensor; and
   a display unit display being integrated into a forward wall of said display housing wherein said display unit display on said display housing is configured to be visible to the driver, said display unit display on said display housing being electrically coupled to said display control circuit, said display unit display on said display housing displaying indicia comprising numbers for communicating the tension sensed by said tension sensor wherein said display unit display on said display housing is configured to facilitate the driver to visually verify the tension of the tie down chain.

5. A tension measuring assembly for facilitating a driver of a cargo vehicle to monitor the tension of tie downs, said assembly comprising:
   a pair of straps, each of said straps having an attachment being configured to be attached to a tie down chain which is securing cargo on a flatbed trailer, each of said straps having a first end and a second end, said attachment associated with each of said straps including a ring portion and a hook portion, a respective one of said straps extending through said ring portion of a respective one of said attachments having said first end of said respective strap being attached to said ring portion, said hook portion curving toward said ring portion wherein said hook portion is configured to be extended through a respective link of the tie down chain, each of said straps being comprised of an elastomeric material thereby facilitating said straps to be stretched;

a tension meter having each of said pair of straps being attached to said tension meter, said tension meter measuring tension in each of said straps wherein said tension meter is configured to measure the tension in the tie down chain when said pair of straps are attached to the tie down chain, said tension meter comprising:

a housing having a front wall and an outer wall, said outer wall having a top side, a bottom side and a lateral side, said outer wall having a pair of slots each extending through a respective one of said top side and said bottom side, each of said straps extending through a respective one of said slots such that said second end of each of said pair of straps is positioned within said housing;

a tension control circuit being positioned within said housing;

a tension senor being positioned within said housing, said tension senor being attached to said second end of each of said pair of straps thereby facilitating said tension sensor to sense tension in said straps, said tension sensor being electrically coupled to said tension control circuit thereby facilitating said tension sensor to communicate the tension to said tension control circuit;

a tension meter display being integrated into said front wall of said housing, said tension meter display being electrically coupled to said tension control circuit, said tension meter display displaying indicia comprising numbers to communicate the degree of tension measured by said tension sensor;

a transmitter being positioned within said housing, said transmitter being electrically coupled to said tension control circuit, said transmitter broadcasting a communication signal comprising the tension sensed by said tension sensor; and a power supply being integrated into said housing, said power supply being electrically coupled to said tension control circuit, said power supply comprising:

a rechargeable battery being positioned in said housing, said rechargeable battery being electrically coupled to said tension control circuit;

a power button being movably integrated into said lateral side of said outer wall of said housing, said power button being electrically coupled to said tension control circuit for turning said tension control circuit on and off when said power button is depressed; and a charge port being recessed into said lateral side of said outer wall of said housing wherein said charge port is configured to insertably receive a charge cord, said charge port being electrically coupled to said rechargeable battery for charging said rechargeable battery; and a display unit being in remote communication with said tension meter thereby facilitating said display unit to display the tension measured by said tension meter wherein said display unit is configured to be positioned in a cab of a vehicle towing the flatbed trailer thereby facilitating a driver of the vehicle to monitor the tension of the tie down chain, said display unit comprising:

a display housing being configured to be positioned in the cab of the vehicle;

a display control circuit being positioned in said display housing, said display control circuit being electrically coupled to a power source comprising an electrical system of the vehicle;

a receiver being positioned in said display housing, said receiver being electrically coupled to said display control circuit, said receiver being in wireless communication with said transmitter such that said receiver receives said communication signal from said transmitter thereby facilitating said display control circuit to receive the tension sensed by said tension sensor; and a display unit display being integrated into a forward wall of said display housing wherein said display unit display on said display housing is configured to be visible to the driver, said display unit display on said display housing being electrically coupled to said display control circuit, said display unit display on said display housing displaying indicia comprising numbers for communicating the tension sensed by said tension sensor wherein said display unit display on said display housing is configured to facilitate the driver to visually verify the tension of the tie down chain.

6. The assembly according to claim 5, wherein each of said attachments comprises a clamp having a first jaw pivotally attached to a second jaw, said clamp associated with each of said attachments being biased into a closed position having said first jaw abutting said second jaw, said clamp associated with each of said attachments extending laterally away from said respective strap wherein each of said clamps is configured to be attached to a cargo strap.

* * * * *